United States Patent [19]

Ashida et al.

[11] Patent Number: 4,614,615

[45] Date of Patent: Sep. 30, 1986

[54] PROCESS FOR PREPARING AN N-SUBSTITUTED CARBAMOYL-LACTAM COMPOUND

[76] Inventors: Kaneyoshi Ashida, 23560 E. Newell Cir., Farmington Hills, Mich. 48024; Jozef L. M. van der Loos, Rijksweg Zuid 146, 6134 AE Sittard, Netherlands; Kurt C. Frisch, 17986 Park La., Grosse Ile, Mich. 48138

[21] Appl. No.: 723,309

[22] Filed: Apr. 15, 1985

Related U.S. Application Data

[63] Continuation-in-part of Ser. No. 592,083, Mar. 22, 1984, abandoned.

[51] Int. Cl.$^4$ .................. C07D 223/10; C07D 211/16; C07D 207/38
[52] U.S. Cl. .................................... 540/525; 546/243; 548/550; 528/310; 528/319; 540/451
[58] Field of Search ................. 260/239.3 R; 546/243; 548/550

[56] References Cited

U.S. PATENT DOCUMENTS

| | | | |
|---|---|---|---|
| 3,245,961 | 4/1966 | Fetscher et al. | |
| 3,511,893 | 5/1969 | Scharffer et al. | 260/85 S |
| 4,502,821 | 7/1983 | Hodek et al. | 502/153 |

FOREIGN PATENT DOCUMENTS

| | | | |
|---|---|---|---|
| 1067153 | 5/1967 | United Kingdom | 260/77.5 |
| 1099265 | 1/1968 | United Kingdom | 260/77.5 |

OTHER PUBLICATIONS

Hedercik et al., "A New RIM System from Nylon 6 Block Co-polymers: Chemistry and Structure", AIChe Nat. Summer Meeting, Detroit, Mich. (8/81).

Allen et al., "Caprolactam Based Block Copolymers Using Polymeric Activators" Die Angewandte Makromolekulare Chemie, vol. 58/59 No. 844, pp. 321–343 (1977).

*Primary Examiner*—Robert T. Bond
*Attorney, Agent, or Firm*—Cushman, Darby & Cushman

[57] ABSTRACT

The invention relates to a process for preparing an N-substituted carbamoyl-lactam compound having the formula:

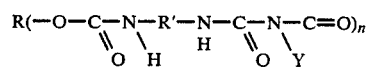

by admixing a polyhydroxy compound having the formula $R(OH)_n$ with a polyisocyanate having the formula OCH—R'—NCO, wherein said n has a value of at least 3, R' is a di-valent hydrocarbon group having 6–25 carbon atoms, and Y is a $C_3$–$C_{14}$ alkylene group, and reacting the product thereof with a lactam. The n value may advantageously range from 3 to 10. The invention also relates to certain novel n-substituted carbamoyl-lactam compounds which can advantageously be used in the preparation of nylon 6 block copolymers, and are particularly useful in reaction injection molding nylon 6.

20 Claims, No Drawings

PROCESS FOR PREPARING AN N-SUBSTITUTED CARBAMOYL-LACTAM COMPOUND

RELATED APPLICATIONS

This is a continuation in-part application of U.S. application Ser. No. 592,083 filed on Mar. 22, 1984, now abandoned, the disclosure of which is incorporated herein by reference.

FIELD OF THE INVENTION

The present invention relates to a process for preparing an N-substituted carbamoyl-lactam. The present invention also includes the resultant N-substituted carbamoyl lactam.

BACKGROUND OF THE INVENTION

In the anionic polymerization of a lactam, especially caprolactam, an anionic polymerization catalyst and an activator (or promoter) are typically present. Various kinds of activators are disclosed in the art.

One proposal for an activated anionic catalytic polymerization process is described in U.S. Pat. No. 3,304,291. The activator used therein consists of organic compounds having at least a 2 to 12 carbon atom containing radical and being an N-substituted compound of at least one urea, thiourea or guanidine radical.

An improvement thereon for producing polylactams having a higher notch impact strength includes conducting the activated anionic catalyzed lactam polymerization process in the presence of a quantity of a polyether soluble in the molten lactam, or the mixture of lactams, being polymerized. The polyether is limited to at most about 25% by weight of the quantity of the lactam to be polymerized, otherwise the resultant polylactams possess poor mechanical properties.

An isocyanate promoter having at least one isocyanate compound has been used in an anionic catalytic polymerization of a lactam conducted in the presence of a polyether soluble in molten lactam.

As further described in U.S. Pat. No. 3,704,280, it is required that the absolute number of hydroxyl (OH) groups contained in the polyether is greater than the absolute number of isocyanate groups contained in the isocyanate employed.

Another improved process for the anionic catalytic polymerization of lactams, aided by one or more promoters, is described in U.S. Pat. No. 3,770,689 and includes adding to the reaction mixture one or more polyether compounds having etherfied hydroxyl groups which are soluble in the molten lactam or lactam mixture. Conventional promoters suitable for use therein include polymers having backbone chains permanently terminated on at least one end by a promoter function. Generally the promoter functional groups or substituents are similar to monomeric promoters such as acidchloride groups, N-carbonyl-sulfonamide groups, N-carbonyl-urea groups and acid-anhydride groups.

U.S. Pat. No. 3,987,033 describes a composition prepared by reacting an aromatic diisocyanate with a triprimary hydroxyl alcohol and subsequently reacting this product with a mixture of a hydroxy component such as a phenol.

U.S. Pat. No. 4,171,305 describes pure cyrstals of ε-caprolactam diblocked ω,ω'-diisocyanato-1,3-dimethylbenzene. The product is used as a hardener in a powder coating composition.

U.S. Pat. No. 4,211,699 describes isocyanate diol adducts derived from an amino diol or a hydrazine diol and an organic diisocyanate. Using the isocyanate diols for producing self-crosslinkable and/or self-crosslinked polyurethanes is described.

U.S. Pat. No. 3,018,273 describes a process for in situ polymerizing caprolactam in the presence of an organomagnesium initiator compound, wherein an N,N diacyl compound is used as a promoter. Preferably, the N,N diacyl compounds are N-substituted imides or cyclic imides of dicarboxylic acids. Preferably, the N,N diacyl compounds have molecular weights not exceeding 1000 in order to preclude the presence of large inert groups in the promoters. More preferably the N,N diacyl compounds have molecular weights not exceeding 500.

British Pat. No. 1,067,153 describes a process for preparing nylon-block-copolymers by anionically polymerizing caprolactam in the presence of an isocyanate-terminated polypropylene glycol and a potassium based catalyst. In this process a nylon block copolymer containing at least one polyetherblock is formed.

In the U.S. Pat. Nos. 4,223,112, 4,031,164, 3,862,262, and 4,034,015 various aspects of the preparation of nylon block copolymers from caprolactam in the presence of an acyl lactam activator are described. U.S. Pat. Nos. 4,223,112 and 4,031,164 describe lactam-polyol-polyacyl-lactam block-terpolymers having a specified ratio of the various components. More particularly, U.S. Pat. No. 4,031,164 discloses the use of 18 to 90% by weight of polyol blocks in the terpolymer. U.S. Pat. No. 3,862,262 describes lactam-polyolacyl-polylactam block-terpolymers, and U.S. Pat. No. 4,034,015 is directed to lactam-polyol-polyacylactam or lactam-polyol-acyl-polylactam block terpolymers having at least about 5% ester end group termination.

U.S. Pat. No. Re 30,371 describes the preparation of polyester-polyamide compounds by condensation of an alcohol with acyl lactams in the presence of at least one of a metal or metal compound. The metal or metal component of the metal compound is selected from Group IA, IIA, IIB and IIIA of the Periodic Table.

The published (Dec. 22, 1982) European patent application Nos. 67693 and 67694, describe specific lactam compounds based upon various kinds of hydroxy compounds, whereas the European patent application Nos. 67694 and 67695 laid open to public inspection on Dec. 22, 1982 describe the use of such lactam compounds in the preparation of nylon block copolymers.

Preparation of nylon compositions by anionically polymerizing at least 75% lactam with up to about 25% of an epoxy component in the presence of a basic catalyst and promoter are disclosed in U.S. Pat. No. 4,400,490. The promoters are those typically used in the anhydrous polymerization of lactams.

A paper by Sibal et al, "Designing Nylon 6 Polymerization Systems", apparently was presented in part at the 2nd International Conference on Reactive Polymer Processing, Pittsburg, PA in November 1982. In connection with the anhydrous anionic polymerization of caprolactam, Sibal et al apparently suggest preparing a cocatalyst or initiator by reacting isocyanate with dried caprolactam at 80° C. Initially the caprolactam may be heated and about 20% thereof boiled off with the dry residue portion being reacted with an isocyanate, the isocyanate being obtained by slowly reacting 1 mole polypropylene glycol (M.W. 2000) with 2 moles hexamethylene diisocyanate. However, this work is said to be incomplete and it is clear that further work is said to be needed to determine reaction conditions, and other process-product characteristics/parameters as well as the processability of any polylactam produced using such an experimental activator.

The nylon block copolymers prepared when using an activator of this kind have various disadvantages. Such copolymers are deficient in thermal resistance, heat distortion temperature and solvent resistance characteristics. Furthermore, the so-called "heat sag" of such copolymers, a measure indicating the product's ability to withstand heat treatment without being deformed, is insufficient. The product cannot withstand the 160° C. and higher temperatures in a curing oven for automobile paints. Finally, an improvement in the impact resistance (Charpy or Izod) of these products is required to make them suitable for application where impact resistance is required.

SUMMARY AND OBJECTS OF THE INVENTION

The invention provides a process for the preparing certain novel N-substituted carbamoyl-type activators for the anionic polymerization of lactams which activator provides nylon block copolymers having improved thermal resistance and impact resistance.

The present invention also provides certain novel N-substituted carbamoyl lactam compounds. The novel compounds are useful activators in preparing nylon block copolymers having excellent physical characteristics.

DESCRIPTION OF THE INVENTION

The present invention relates to a process for preparing certain novel N-substituted carbamoyl-lactam compounds. This process may be broadly described as reacting a lactam with an isocyanate compound and a polyhydroxy compound having hydroxyl group functionality value of at least 3. The present invention also relates to certain novel n-substituted carbamoyl-lactam compounds.

The present process is important in connection with the preparation of compounds particularly suitable for use as activators in preparing nylon block copolymers acceptable in RIM nylon systems (reaction-injection-moulding).

Surprisingly, it has been found that in accordance with the present process the N-substituted-carbamoyl lactam compounds can now be obtained in a reliable, reproducible, and easy manner. These compounds can be used as activators for preparing nylon block-copolymers, in a combination with a lactam polymerization catalyst. The improved nylon block copolymers produced using the present novel N-substituted carbamoyl compounds have superior thermal resistance, heat distortion temperature and solvent resistance characteristics. Also, such nylon block copolymers produced using the present novel N-substituted carbamoyl compounds withstand heat without deformation and have an improved and superior impact resistance.

This process produces novel N substituted carbamoyl-lactam compounds having the following formula (in the case where a difunctional isocyanate has been used):

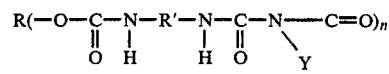

In the above formula, n has a value of at least 3

R is the residue radical of a polyhydroxy compound

R' is a divalent hydrocarbon group having 6 to 25 carbon atoms, and

Y is a $C_3$–$C_{14}$ ring-forming alkylene group.

In the present invention, the isocyanate terminated component is the reaction product of a polyisocyanate and a polyol having a hydroxyl group functionality value of at least 3 and up to 10. Advantageously the polyol has a hydroxy functionality value of 3 to 8. More advantageously, the polyol has a hydroxy functionality of 3 to 6 and most advantageously the polyol has a hydroxy functionality value of 3 to 4.

Various polyisocyanates are suitable for use in the present process. Broadly speaking, such polyisocyanates have an isocyanate functionality of two and from 6 to 25 carbon atoms. Thus, in the above formula R' is a 6 to 25 carbon radical (residue) derived from the polyisocyanate, such as aliphatic, araliphatic, cycloaliphatic and aromatic isocyanates. Examples include 1,5 and 1,6 hexanediisocyanate or hexamethylene diisocyanate, isophorone-diisocyanate (IPDI) and xylylene diisocyanate (XDI). Exemplary and readily available diisocyanates include 2,4- and 2,6-toluene diisocyanate, 2,2'-, 2,4'-, and 4,4'-diphenylmethane diisocyanate (MDI). Other polyisocyanates include polyphenylene polymethylene polyisocyanates (polymeric isocyanates). Also suitable polyisocyanates include modified MDI (e.g. carbodiimide-modified MDI), and the hydrogenated aromatic diisocyantes such as hydrogenated TDI, XDI or MDI.

In the above-formula R is an at least tri-valent hydrocarbon radical derived from a polyhydroxy compound. More advantageously, R is a tri-valent to deca-valent hydrocarbon radical, and particularly advantageous are tri-valent to octa-valent and tri-valent to hexa-valent hydrocarbon radicals. Suitable polyhydroxy compounds are triols or higher hydroxy functionality compounds. Preferably such compounds are selected from the group of polyether polyols, polyester polyols, and polybutadiene polyols, polycarbonate polyols, siloxane containing polyols and the so called "polymer" polyols. The "polymer" polyols as defined herein comprise graft polymers obtained by grafting one or more ethylenically unsaturated monomers onto a polyether polyol. So called PUD polyols or polyurea dispersions can be obtained by dissolving a diamine or hydrazine together with a diisocyanate in stoichiometric amounts in a polyol and reacting the dissolved compounds to form a polyurea compound dispersed in the polyol. The amount of polyurea dispersed in the polyol is from 10% to 35% by weight of the total dispersion.

The polymer polyol contains from 10% to 35% by weight, of the graft polymer based on the total weight of the polyol. Examples of suitable grafting monomers are especially acrylonitrile or a mixture of styrene and acrylonitrile. An example of the polyol is such as Niax 31-28 (product of Union Carbide Corporation). A major advantage of using these "polymeric" polyols is that the resulting product (nylon block copolymer) has a higher flexural modulus without decrease in impact resistance.

Other examples of polyols that can advantageously be used are the triols and tetrols of polyethylene oxide, polypropylene oxide, polyether segments containing polyesters, polyamine polyols having tertiary amino groups and polylactones such as caprolactones. It is also possible to use a polyol that has been obtained by ethoxylating and/or propoxylating ethylene diamine, glucose, fructose, saccharose or trimethylolpropane. As indicated above, the polyols are mainly polymeric polyols. The equivalent weight is advantageously 100 to 3000. More particularly, the equivalent weight ranges between 1000 and 2500.

It is also quite possible to use low molecular weight polyols. In particular, if the novel N-substituted carbamoyl compound is used in a polyurethane, such as a polyurethane coating, it is advantageous to start from one or more low molecular weight polyols such as glycerol or tri-methylolpropane.

Mixtures of two or more polyols can also be used.

It should be understood that any molecular weight, or equivalent weight, referred to herein is a numerical average weight. Furthermore, the term equivalent weight of a polyol is understood to mean the numerical average weight of the polyol per hydroxyl group, i.e. the molecular weight divided by its hydroxyl functionality.

In a preferred embodiment of the present invention the polyol component includes a certain amount of a diol additive. Advantageously, the polyol includes an amount of 2 eq.% to 60 eq.%, based upon to the amount of hydroxyl-groups, of a di-functional hydroxy compound admixed therewith. This diol can be added to polyhydroxy compound, i.e. three or higher functional polyol, prior to the reaction thereof with the polyisocyanate. However, it is also possible to prepare the activator or precursor thereof based upon the diol and the tri- or higher functional polyol separately, and then mix the various components at a suitable stage.

In connection with the diol additive, possible diol impurities in the polyol are of no consequence and are not considered in determining amounts of the diol additive employed.

Preferably, the high molecular weight diols are used. Advantageously, these diols exert a positive influence when the N-substituted carbamoyl-lactam compounds are used for the preparation of nylon block copolymers. Such higher molecular weight diols have a hydroxyl equivalent weight of 300 to 3000 and more advantageously the high molecular weight diols have a hydroxy equivalent weight ranging between 1000 and 2500. Suitable high molecular weight diols are the glycol-based polyether diols such as poly(ethylene oxide) glycol, poly(propylene oxide) glycol, poly(tetramethylene oxide) glycol, random or block copolyethers of ethylene oxide and propylene oxide, polyesterdiols, polycarbonate diols and the like.

Low molecular weight diols can, if desired, also be used in the present invention. Such diols have a molecular weight of up to 350. Exemplary low molecular weight diols include ethylene glycol, 1,3 propylene glycol, 1,2 propane diol, 1,2 butane diol, 1,3 butane diol, 1,4 butane diol, 1,5 pentane diol, 1,10 decane diol, 1,1 dimethylol-3-cyclohexene, diethylene glycol, dipropylene glycol, 2 (hydroxyethoxy)-1-propanol, glycerol or mixtures of two or more of these compounds.

Usually the reaction between the polyol and the polyisocyanate does not require the presence of a catalyst. If an aliphatic isocyanate is used, then a minor amount of catalyst may be present to accelerate the reaction. Conventional polyurethane catalysts are suitable and include, for instance, tertiary amines or tin (II) or tin (IV) carboxylate salts. A catalyst is not necessary when an aromatic polyisocyanate is used.

Preferably, no solvent is used in this reaction. However, if the viscosity of the isocyanate terminated polyurethane becomes too high for easy processing, then any suitable solvent can be used, such as ethoxy-ethyl acetate (cellosolve acetate). This solvent can be distilled off during or after the polyol-polyisocyanate reaction, or even after the reaction with lactam.

Various lactams are suitable for use in the present process. Generally, lactams having from 4 to 14 carbon-atom rings are suitable and lactams having from 5 to 11 carbon atom rings are preferred. Such lactams may have straight chain or branched chain alkyl substituents on the lactam ring that do not inhibit or adversely affect preparation of the activator or the subsequent use thereof. Examples of suitable lactams include, for instance, 2-pyrrolidone, 2-piperidone, lauryl lactam, caprolactam and the like. Alkyl substituted lactams include, for instance, 6-amino-5-methyl hexanoic acid lactam and 6-amino-3-methyl-hexanoic acid lactam. Preferably ε-caprolactam is employed.

Other polyamide forming compounds are generally inappropriate. Dicarboxylic acids, for instance, disturb the anionic polymerization reaction. Moreover, it is theorized that the use of amino compounds may result in the decomposition of the carbamoyl lactam to lactam and urea compounds. Water-forming side reactions, such as condensation of diacids with diamines with a water by-product, interfere with activator formation.

The ratio of the various reaction components depends mainly on their functionality. In general the ratio of isocyanate groups (NCO) to hydroxy groups (OH) is approximately 2. In reacting the isocyanate terminated polyurethane and the lactam, the ratio of NCO to lactam will be about 1.

Advantageously, the novel N-substituted carbamoyl compound can be used as an activator in the anionic polymerization of lactams. More particularly, it is an activator in lactam polymerization to obtain a a nylon block copolymer. This anionic polymerization requires the presence of an anionic polymerization catalyst, such as alkali metal lactamate, especially sodium or potassium lactamate, and Grignard lactamates, especially bromo magnesium lactamate. The catalysts can be used in an amount of 0.01-10 equivalent % with respect to the lactam. Advantageously, the catalyst is used in an amount of from 0.1 to 3 equivalent % with respect to the lactam.

The novel N-substituted carbamoyl lactam compounds prepared according to the invention are useful in reaction-injection-molding of nylon 6 RIM. In RIM, polyamide-forming compounds are injected into a closed mold and rapid polymerization occurs in the mold, resulting in a molded nylon 6 product which can be subsequently recovered.

The amount of polyether (the rubbery component in the nylon block copolymer) with respect to the final nylon block copolymer, lies advantageously between 5 wt. % and 35 wt. %, more advantageously between 10 wt. % and 30 wt. %, and most advantageously between 20-35 wt. % with respect to the final product.

Within these ranges the combination of impact strength and flexural modulus of the nylon block-copolymer is optimal.

The anionic polymerization of a lactam is advantageously conducted at a temperature between the melting point of the lactam and the melting point of the resulting nylon block copolymer, and more advantageously at a temperature between 90° C. and 160° C., and most advantageously at about 130° C. to 140° C.

The following non-limiting examples illustrate various aspects and embodiments of the present invention.

EXAMPLE 1

87.6 grams (0.668 equivalent) of methylene bis(4-cyclohexylisocyanate) (Desmodur W from Mobay Chemicals) and 500 grams (0.223 equivalents) of a primary hydroxyl group-terminated polyether triol having an OH equivalent weight of 2244 (Pluracol 380 from BASF Wyandotte Corp.), were charged into a reaction kettle, and the mixture was heated while stirring under a nitrogen blanket. The heating at 70° C. and stirring under nitrogen blanket was conducted for 6 hours and 40 min. until the theoretical NCO percent (3.19%) was reached. In this reaction, no catalyst was used in preparing this reaction product.

50.4 g (0.445 mole) of ε-caprolactam was added to the above reaction product. The mixture was stirred for 5 hours at 85° C. The resultant product, i.e., caprolactam-urethane prepolymer adduct, was highly viscous at room temperature, but was liquid at 70° C.

EXAMPLE 2

500 grams (0.223 equivalent) of a primary hydroxyl group-terminated polyether triol having an OH equivalent weight of 2244 (Pluracol 380) was mixed with 56.2 grams (0.670 equivalent) of hexamethylene diisocyanate (HDI). The mixture was heated for 5 hours and 50 minutes at 75° C. to reach the theoretical NCO percent (3.37%). 50.6 grams (0.447 mole) of ε-caprolactam was added to the reaction product, and the mixture was heated for 5 hours at 85° C. to obtain a reaction product.

The reaction product was a ε-caprolactam-urethane prepolymer adduct. The adduct was highly viscous at room temperature, and was liquid at 75° C.

The ε-caprolactam adducts obtained according to Examples 1 and 2 were used to make block copolymers of nylon 6 in the presence of a sodium lactamate or a potassium lactamate polymerization catalyst. The results obtained are shown in Tables I to IV-C. In the Tables, CLM stands for ε-caprolactam.

In Tables I to IV the following are shown: the amount of ε-caprolactam was varied and therefore the weight percent of the polyether in the nylon 6 block copolymer product was varied from 10.1 wt.% to 51.5 wt.%. The equivalents and weight percents thus relate to component ratios of the reactants used in preparing the products. The two catalysts were used at various concentrations as reported in Tables I to IV. Tables I to IV show that the most rapid reactions were obtained using the potassium lactamate catalyst instead of the sodium lactamate catalyst. Also, the adduct prepared from a hexamethylene diisocyanate based prepolymer capped with caprolactam was polymerized in the presence of the potassium lactamate catalyst had a shorter reaction time.

The reported results establish that an HDI-based adduct exhibited higher reactivity than a Desmodur W based adduct in both solidification time and cloud point. In general cloud point or solidifcation time is considered inversely proportional to the reaction rate constant.

The solidification time was determined by bubbling dry nitrogen through the reaction mixture during copolymerization and measuring the elapsed time from the start of the polymerization until the nitrogen could no longer bubble through the solidifying copolymer.

A rapid polymerization time is, of course, of great advantage in RIM techniques because the mold cycle time is greatly reduced.

TABLE I

Rate Study of (HDI + Pluracol 380) Adduct-CLM Copolymerization at 130° C. using Sodium Lactamate

| Product No. | Polyether wt. % | Activator eq % | Catalyst eq % | Cloud Point | Solidification Time |
|---|---|---|---|---|---|
| 1 | 51.5 | 14.4 | 6.2 | 1 min. 45 sec | 2 min. 20 sec. |
| 2 | 34.2 | 5.6 | 4.3 | 1 min. 35 sec. | 2 min. 40 sec. |
| 3 | 20.6 | 2.8 | 3.4 | 2 min. 30 sec. | 4 min. 30 sec. |
| 4 | 13.7 | 1.6 | 3.1 | 6 min. | 11 min. |
| 5 | 10.3 | 1.2 | 3.0 | 16 min. | 20 mn. |

TABLE II

Rate Study of (Des. W + Pluracol 380) Adduct-CLM Copolymerization using Sodium Lactamate at 130° C.

| Product No. | Polyether wt. % | Activator eq % | Catalyst eq % | Cloud Point | Solidification Time |
|---|---|---|---|---|---|
| 6 | 49.0 | 11.8 | 6.3 | 2 min. 40 sec. | 2 min. 50 sec. |
| 7 | 32.7 | 5.4 | 4.3 | 2 min. 15 sec. | 3 min. 10 sec. |
| 8 | 19.6 | 2.6 | 3.4 | 4 min. | 6 min. 15 sec. |
| 9 | 13.1 | 1.8 | 3.1 | 11 min. 20 sec. | 14 min. 30 sec. |

TABLE III

Rate Study of (Des. W + Pluracol-380) Adduct-CLM Copolymerization at 130° C. using Potassium Lactamate

| Product No. | Polyether wt. % | Activator eq. % | Catalyst eq. % | Cloud Point | Solidification Time |
|---|---|---|---|---|---|
| 10 | 49.0 | 12.6 | 22.6 | 1 min. 15 sec. | 2 min. 30 sec. |
| 11 | 32.7 | 5.6 | 15.2 | 1 min. 45 sec. | 2 min. 15 sec. |
| 12 | 19.6 | 2.6 | 12.0 | 3 min. | 3 min. 45 sec. |
| 13 | 13.1 | 1.6 | 10.9 | 3 min. 40 sec. | 4 min. 40 sec. |
| 24 | 20.0 | 2.8 | 2.0 | 3 min. 40 sec. | 4 min. 05 sec. |
| 25 | 20.0 | 2.8 | 3.1 | 2 min. 45 sec. | 3 min. 10.sec. |
| 26 | 20.0 | 2.8 | 4.2 | 3 min. 10 sec. | 3 min. 35 sec. |
| 27 | 20.0 | 2.9 | 6.4 | 3 min. 35 sec. | 4 min. 30 sec. |
| 28 | 20.0 | 3.0 | 8.8 | 3 min. 40 sec. | 4 min. 25 sec. |

TABLE III-A

| | Product No. | | | | |
|---|---|---|---|---|---|
| | 24 | 25 | 26 | 27 | 28 |
| Polyol wt. % | 20 | 20 | 20 | 20 | 20 |
| CLM, g | 27.2 | 25.9 | 24.6 | 22.0 | 19.4 |
| KL (2 eq/kg), g | 2.6 | 3.9 | 5.2 | 7.8 | 10.4 |
| P-380/Des.W/CLM Adduct (NCO/OH = 3/1), g | 10.2 | 10.2 | 10.2 | 10.2 | 10.2 |
| Total CLM, g | 30.4 | 30.3 | 30.2 | 39.0 | 29.8 |
| Free CLM, g | 29.0 | 28.6 | 28.2 | 27.4 | 26.7 |
| Free CLM + CLM in adduct, g | 29.8 | 29.4 | 29.0 | 28.2 | 27.5 |
| Total wt., g | 40 | 40 | 40 | 40 | 40 |
| Total CLM, wt. % | 76.0 | 75.8 | 75.5 | 75.0 | 74.5 |
| meq., Free CLM | 257 | 253 | 250 | 242 | 236 |
| meq., KL | 5.2 | 7.8 | 10.4 | 15.6 | 20.8 |
| meq., Adduct | 7.1 | 7.1 | 7.1 | 7.1 | 7.1 |
| eq. ratio, KL/CLM, % | 2.0 | 3.1 | 4.2 | 6.4 | 8.8 |
| eq. ratio, Adduct/CLM, % | 2.8 | 2.8 | 2.8 | 2.9 | 3.0 |
| eq. ratio, KL/Adduct | 0.73 | 1.10 | 1.5 | 2.2 | 2.93 |
| CLM/Adduct, kg/eq. | 4.1 | 4.1 | 4.1 | 4.0 | 3.9 |
| A Component, °C.* | 95 | 95 | 95 | 95 | 95 |

TABLE III-A-continued

|  | Product No. | | | | |
|---|---|---|---|---|---|
|  | 24 | 25 | 26 | 27 | 28 |
| B Component, °C.* | 95 | 95 | 95 | 95 | 95 |
| Mixing temp., °C. | 95 | 95 | 95 | 95 | 95 |
| Polymerization temp., °C. | 130 | 130 | 130 | 130 | 130 |

*A Component: KL + CLM
B Component: Adduct + CLM

TABLE IV

Rate Study of (HDI + Pluracol 380) Adduct-CLM
Copolymerization at 130° C. using Potassium Lactamate

| Product No. | Polyether wt. % | Activator eq % | Catalyst eq % | Cloud Point | Solidification Time |
|---|---|---|---|---|---|
| 14 | 51.5 | 13.2 | 22.5 | 1 min. 20 sec. | 1 min. 30 sec. |
| 15 | 34.3 | 6.0 | 15.1 | 50 sec. | 1 min. 15 sec. |
| 16 | 20.6 | 2.8 | 12.0 | 1 min. 30 sec. | 1 min. 50 sec. |
| 17 | 13.7 | 1.8 | 10.9 | 3 min. 30 sec. | 4 min. 15 sec. |
| 29 | 10.1 | 1.2 | 0.5 | 3 min. 25 sec. | 4 min. 0 sec. |
| 30 | 10.1 | 1.2 | 1.0 | 2 min. 35 sec. | 2 min. 55 sec. |
| 31 | 10.1 | 1.2 | 2.0 | 2 min. 30 sec. | 2 min. 55 sec. |
| 32 | 10.1 | 1.2 | 3.0 | 2 min. 20 sec. | 2 min. 40 sec. |
| 33 | 10.1 | 1.3 | 6.3 | 4 min. 35 sec. | 5 min. 10 sec. |
| 34 | 20.0 | 2.7 | 2.1 | 1 min. 50 sec. | 2 min. 25 sec. |
| 35 | 20.0 | 2.8 | 3.1 | 1 min. 30 sec. | 2 min. 05 sec. |
| 36 | 20.0 | 2.9 | 6.2 | 1 min. 30 sec. | 2 min. 20 sec. |
| 37 | 30.0 | 4.9 | 2.1 | 8 min. 45 sec. | 11 min. 05 sec. |
| 38 | 30.0 | 5.0 | 3.2 | 1 min. 15 sec. | 1 min. 35 sec. |
| 39 | 30.0 | 5.2 | 6.3 | 0 min. 50 sec. | 1 min. 20 sec. |
| 40 | 40.0 | 8.5 | 6.3 | 0 min. 35 sec. | 1 min. 10 sec. |

TABLE IV-A

|  | Product No. | | | | |
|---|---|---|---|---|---|
|  | 29 | 30 | 31 | 32 | 33 |
| Polyol, wt. % | 10.1 | 10.1 | 10.1 | 10.1 | 10.1 |
| CLM, g | 34.3 | 33.6 | 32.1 | 30.6 | 26.1 |
| KL (2 eq/kg), g | 0.8 | 1.5 | 3.0 | 4.5 | 9.0 |
| P-380/HDI/CLM Adduct (NCO/OH = 3/1), g | 4.9 | 4.9 | 4.9 | 4.9 | 4.9 |
| Total CLM, g | 35.4 | 35.4 | 35.3 | 35.2 | 34.8 |
| Free CLM, g | 34.86 | 34.65 | 34.19 | 33.74 | 32.38 |
| Free CLM + CLM in adduct g | 35.27 | 35.06 | 34.60 | 34.15 | 32.79 |
| Total wt., g | 40 | 40 | 40 | 40 | 40 |
| Total CLM, wt. % | 88.5 | 88.5 | 88.3 | 88.0 | 87.0 |
| meq., Free CLM | 308 | 307 | 303 | 299 | 287 |
| meq., KL | 1.6 | 3.0 | 6.0 | 9.0 | 18.0 |
| meq., Adduct | 3.6 | 3.6 | 3.6 | 3.6 | 3.6 |
| eq. ratio, KL/CLM, % | 0.52 | 0.98 | 1.98 | 3.01 | 6.27 |
| eq. ratio, Adduct/CLM, % | 1.17 | 1.17 | 1.19 | 1.20 | 1.25 |
| eq. ratio, KL/Adduct | 0.44 | 0.83 | 1.67 | 2.5 | 5 |
| CLM/Adduct, kg/eq. | 9.8 | 9.7 | 9.6 | 9.5 | 9.1 |
| A Component, °C.* | 95 | 95 | 95 | 95 | 95 |
| B Component, °C.* | 95 | 95 | 95 | 95 | 95 |
| Mixing temp., °C. | 95 | 95 | 95 | 95 | 95 |
| Polymerization temp., °C. | 130 | 130 | 130 | 130 | 130 |
| Gel time, min. | 3'25" | 2'35" | 2'30" | 2'20" | 4'35" |

*A Component: KL + CLM
B Component: Adduct + CLM

TABLE IV-B

|  | Product No. | | |
|---|---|---|---|
|  | 34 | 35 | 36 |
| Polyol, wt. % | 20 | 20 | 20 |
| CLM, g | 27.6 | 26.3 | 22.6 |
| KL (2 eq/kg), g | 2.7 | 4.0 | 7.7 |
| P-380/HDI/CLM Adduct (NCO/OH = 3/1), g | 9.7 | 9.7 | 9.7 |
| Total CLM, g | 30.9 | 30.8 | 30.5 |

TABLE IV-B-continued

|  | Product No. | | |
|---|---|---|---|
|  | 34 | 35 | 36 |
| Free CLM, g | 29.5 | 29.1 | 28.0 |
| Free CLM + CLM in adduct, g | 30.3 | 29.9 | 28.8 |
| Total wt., g | 40 | 40 | 40 |
| Total CLM, wt. % | 77.3 | 77.0 | 76.3 |
| meq., Free CLM | 261 | 258 | 248 |
| meq., KL | 5.4 | 8.0 | 15.4 |
| meq., Adduct | 7.1 | 7.1 | 7.1 |
| eq. ratio, KL/CLM, % | 2.07 | 3.10 | 6.21 |
| eq. ratio, Adduct/CLM, % | 2.72 | 2.75 | 2.86 |
| CLM/Adduct, kg/eq. | 4.4 | 4.3 | 4.3 |
| A Component, °C.* | 95 | 95 | 95 |
| B Component, °C.* | 95 | 95 | 95 |
| Polymerization temp., °C. | 130 | 130 | 130 |
| Gel time, min. | 1'50" | 1'30" | 1'30" |

A Component: KL and ε-caprolactan (CLM)
B Component: Adduct and CLM

TABLE IV-C

|  | Product No. | | | |
|---|---|---|---|---|
|  | 37 | 38 | 39 | 40 |
| Polyol, wt. % | 30 | 30 | 30 | 40 |
| CLM, g | 23.1 | 22.0 | 18.9 | 15.3 |
| KL (2 eq/kg), g | 2.3 | 3.4 | 6.5 | 5.3 |
| P-380/HDI/CLM Adduct (NCO/OH = 3/1), g | 14.6 | 14.6 | 14.6 | 19.4 |
| Total CLM, g | 26.4 | 26.3 | 26.1 | 21.8 |
| Free CLM, g | 24.7 | 24.4 | 23.4 | 19.0 |
| Free CLM + CLM in adduct, g | 25.9 | 25.6 | 24.6 | 20.6 |
| Total wt., g | 40 | 40 | 40 | 40 |
| Total CLM, wt. % | 66.0 | 65.8 | 65.3 | 54.5 |
| meq., Free CLM | 219 | 216 | 207 | 168 |
| meq., KL | 4.6 | 6.8 | 13.0 | 10.6 |
| meq., Adduct | 10.7 | 10.7 | 10.7 | 14.3 |
| eq. ratio, KL/CLM, % | 2.1 | 3.15 | 6.28 | 6.31 |
| eq. ratio, Adduct/CLM, % | 4.89 | 4.95 | 5.17 | 8.5 |
| eq. ratio, KL/Adduct | 0.43 | 0.64 | 1.21 | 0.74 |
| CLM/Adduct, kg/eq. | 2.4 | 2.4 | 2.3 | 1.5 |
| A Component, °C.* | 95 | 95 | 95 | 95 |
| B Component, °C.* | 95 | 95 | 95 | 95 |
| Mixing temp., °C. | 95 | 95 | 95 | 95 |
| Polymerization temp., °C. | 130 | 130 | 130 | 130 |
| Gel time, min. | 8'45" | 1'15" | 50" | 35" |

*A Component: potassium lactamate (KL) + ε-caprolactam CLM
B Component: Adduct + CLM

EXAMPLE 3

The nylon 6 polymerization reactions of this Example were next conducted on a larger scale than the polymerization reactions of Examples 1 and 2.

In this Example, a reaction injection molding apparatus was used to prepare block copolymers of nylon 6 as follows. A prepolymer adduct according to Example 1 was dissolved in caprolactam was designated as injection molding stream "A". A prepolymer adduct according to Example 2 separately dissolved in caprolactam was designated as injection molding stream "B". A Grignard catalyst, lactam magnesium bromide, dissolved in caprolactam was designated as injection molding stream "C". A potassium lactamate catalyst dissolved in caprolactam was designated as injection molding stream D. Certain products were prepared by admixing either stream A or B with stream C and injecting the mixture into the mold. Certain additional products were prepared by admixing stream A or stream B with stream D and injecting the mixture into the mold. The combination of streams used in preparing the products is shown below.

| Nylon 6 Product No. | Combination of RIM Streams |
|---|---|
| 18 | B and C |
| 19 | B and C |
| 20 | B and C |
| 21 | A and C |
| 22 | A and D |
| 23 | B and D |
| 41 | A and C |
| 42 | B and C |

Products 18 through 23 (see Table V) were prepared at a molding temperature of 130° C. Products 41 and 42 (see Table IX) were prepared at a molding temperature of 160° C.

The following Tables summarize certain physical properties of the resulting nylon 6 block copolymers. Product 18 was prepared using an adduct/caprolactam weight ratio of 25/75. Product 19 was prepared using an adduct/caprolactam weight ratio of 50/50. Product 20 was prepared using an adduct/caprolactam ratio of 75/25. Product 21 was prepared using an adduct/caprolactam ratio of weight 50/50. Table V shows mechanical strengths.

TABLE V

Mechanical Strengths of the Nylon 6 Block Copolymer

| Product No. | Polyether wt. % | Activator (eq %) | T.S.*$^a$ kpsi/MPa | 100% Modulus a kpsi/MPa$^a$ | Elongation %$^a$ | T.S.*$^b$ kpsi/MPa | 100%$^b$ Modulus kpsi/MPa | Elongation %$^b$ | Tear Strength (pli)/(kN/m)$^b$ |
|---|---|---|---|---|---|---|---|---|---|
| 18$^c$ | 44.1 | 9.4 | 1.6 | 0.8 | 321 | 1.5 | 1.0 | 433 | 585 |
|  |  |  | 11.0 | 5.7 |  | 10.3 | 7.2 |  | 102.0 |
| 19$^c$ | 29.4 | 4.6 | 1.5 | 1.4 | 120 | 1.3 | — | 76 | 459 |
|  |  |  | 10.3 | 9.9 |  | 8.6 |  |  | 80 |
| 20$^c$ | 14.8 | 2.0 | 5.3 | Brittle | 33 | 3.0 | — | 84 | 131 |
|  |  |  | 36.8 |  |  | 21.00 |  |  | 23 |
| 21$^d$ | 28.0 | 4.4 | 3.2 | Brittle |  | 2.2 | — | 127 | 416 |
|  |  |  | 22.3 |  |  | 14.8 |  |  | 73 |

*Tensile Strength

Note:
$^a$Mechanical strength characteristics determined before water absorption.
$^b$Mechanical strength characteristics determined after water absorption.
$^c$Nylon 6 block copolymer using Pluracol 380, HDI and caprolactam.
$^d$Nylon 6 block copolymer using Pluracol 380, Desmodur-W and caprolactam.

Table VI summarizes Izod impact strengths (ASTM D 256) of the nylon 6 block copolymer prepared using an adduct of hexamethylene diisocyanate and Pluracol 380 with ε-caprolactam at an adduct/caprolactam ratio of 75/25. Table VI-A summarizes Izod impact strengths (ASTM D 256) of the nylon 6 block copolymers using an adduct of Desmodur W, Pluracol 380 with ε-caprolactam at the same adduct/caprolactam ratio. In Table VI, three sections ($B_1$, $B_2$ and $B_3$) from product 19 were separately tested. In Table VI-A, three sections ($C_1$, $C_2$ and $C_3$) from product 21 were tested.

TABLE VI

Izod Impact Strength of the Nylon 6 Block Copolymer

| Product | Sample # | Impact Strength in (ft-lb/in) | (J/m) | Impact Average Strength (ft-lb/in) | (J/m) |
|---|---|---|---|---|---|
| 19 | B1 | 3.8 | 170 |  |  |
|  | B2 | 3.1 | 167 | 3.5 | 189 |
|  | B3 | 3.7 | 200 |  |  |

TABLE VI-A

Izod Impact Strength of the Nylon 6 Block Copolymer

| Product | Sample # | Impact Strength in (ft-lb/in) | (J/m) | Impact Average Strength (ft-lb/in) | (J/m) |
|---|---|---|---|---|---|
| 21 | C1 | 2.9 | 156 |  |  |
|  | C2 | 3.1 | 167 | 2.8 | 148 |
|  | C3 | 2.3 | 122 |  |  |

Tables VII and VII-A report the thermal stability (ASTM E-537-76) of the nylon 6 block copolymers in terms of TGA. Table VII reports the thermal stability of a nylon 6 block copolymer prepared from hexamethylene diisocyanate, Pluracol 380, and ε-caprolactam. Table VIA reports the thermal stability of a nylon 6 block copolymer prepared from hexamethylene diisocyanate, Pluracol 380 and ε-caprolactam.

TABLE VII

Thermal Stability of the Nylon 6 Block Copolymer

| Product No. | Temperature at 10% wt. loss | Temperature at 50% wt. loss |
|---|---|---|
| 18 | 185° C. | 370° C. |
| 19 | 145° C. | 345° C. |
| 20 | 130° C. | 325° C. |

TABLE VII-A

Thermal Stability of the Nylon 6 block Copolymer

| Product No. | Temperature at 10% wt. loss | Temperature at 50% wt. loss |
|---|---|---|
| 21 | 180° C. | 340° C. |

Table VIII shows the Shore D hardness before and after water absorption. The Shore D measurements were according to ASTM D-2240.

TABLE VIII

Shore D Hardness

| Product No. | Polyether (wt. %) | Activator (eq %) | Before Water Absorption | After Water Absorption |
|---|---|---|---|---|
| 18$^a$ | 44.1 | 9.4 | 36 | 36 |
| 19$^a$ | 29.4 | 4.6 | 43 | 43 |
| 20$^a$ | 14.8 | 2.0 | 70 | 68 |
| 21$^b$ | 28.0 | 4.4 | 61 | 60 |
| 22$^c$ | 13.1 | 1.6 | 64 | 55 |

TABLE VIII-continued

| Product No. | Polyether (wt. %) | Activator (eq %) | Shore D Hardness Before Water Absorption | Shore D Hardness After Water Absorption |
|---|---|---|---|---|
| 23[c] | 13.7 | 1.8 | 67 | 59 |

[a]Products prepared with HDI, Pluracol 380 and ε-caprolactam using a lactam magnesium bromide catalyst.
[b]Products prepared with Desmodur W, Pluracol 380, and ε-caprolactam using a lactam magnesium bromide catalyst.
[c]Products prepared with Desmodur W, Pluracol 380 and ε-caprolactam using a potassium-lactamate catalyst. The mold temperature was 130° C.

Table IX shows mechanical properties of nylon 6 block copolymers prepared at a molding temperatures of 160° C. in the presence of a lactam magnesium bromide catalyst. Product 41 was prepared using Desmodur W, Pluracol 380 and caprolactam under the aforesaid conditions and Product 42 was prepared under identical conditions using Pluracol 380, hexamethylene diisocyanate, and caprolactam. The flexural modulus was determined according to ASTM D-790-71. The tensile strength and elongation at break were determined according to ASTM D-421.

TABLE IX

| | | | Mechanical properties at molding temperature 160° C. | | | |
|---|---|---|---|---|---|---|
| Product No. | Polyether (wt. %) | Activator eq. % | Flexural Modulus (MPa) | Notched Izod Impact (J/m) | Tensile Strength (MPa) | Elongation % |
| 41 | 25 | 3.8 | 1160 | 644 | 35.3 | 198 |
| 42 | 25 | 3.7 | 980 | 712 | 36.8 | 118 |

EXAMPLE 4

A prepolymer adduct was prepared according to Example 1 using a combination of a diol and a triol. The diol was PPG 4000 and the triol was Pluracol P-380. PPG 4000 is a polypropylene glycol having a molecular weight of approximately 4000. The isocyanate used in preparing the adduct was Desmodur W. The prepolymer adduct was dissolved in caprolactam to form reaction injection molding stream E. A lactam magnesium bromide catalyst dissolved in caprolactam was used as a reaction injection molding stream F. Streams E and F were admixed and injected into the mold at a mold temperature of 160° C.

Table X summarizes certain physical properties of the nylon 6 block copolymers obtained by using a mixture of diol-carbamoyl lactam and triol-carbamoyl lactam compounds.

Within the principles described for this invention, it will be appreciated that a variety of lactam copolymers may be prepared according to the methods illustrated in the foregoing examples to advice comparable results.

TABLE X

| | | Mechanical properties with diol and triol polyethers | | | | |
|---|---|---|---|---|---|---|
| Product No. | Polyether diol (wt. %) | Polyether triol (wt. %) | Activator (eq. %) | Flexural Modulus (MPa) | Notched Izod Impact Strength (J/m) | Tensile Strength (MPa) | Elongation % |
| 43 | 5.3 | 19.7 | 3.5 | 1200 | 663 | 38.4 | 189 |
| 44 | 12.9 | 12.1 | 2.9 | 1200 | 616 | 39.1 | 229 |

Note: These samples were prepared using the lactam magnesiumbromide as the catalyst, at a mold temperature of 160° C.

What is claimed:

1. A process for preparing an n-substituted carbamoyl lactam compound having the formula:

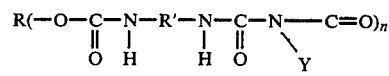

which comprises admixing a polyhydroxy compound having the formula R(OH)$_n$ wherein
n has a value of at least 3, with a diisocyanate having the formula OCN—R'—NCO, at an NCO/OH equivalence ratio >2 wherein,
R' is divalent hydrocarbon residue radical having from 6 to 25 carbon atoms,
and then reacting the product thereof with at least one lactam, said lactam having a 4 to 14 carbon ring, wherein Y is a $C_3$–$C_{13}$ alkylene group.

2. Process according to claim 1, wherein said polyol is a polyether polyol, a polyester polyol, a polybutadiene polyol, a grafted polyether polyol or a polyurea dispersion polyol.

3. Process according to claim 1, wherein said diisocyanate is hexamethylene diisocyanate, isophorone diisocyanate, 2,2'-, 2,4'- and 4,4'-diphenylmethane diisocyanate, 2,4- and 2,6-toluene diisocyanate, or mixtures thereof.

4. Process according to claim 3, wherein said diisocyanate is hexamethylene diisocyanate.

5. Process according to claim 1, wherein said lactam is ε-caprolactam.

6. Process according to claim 1, wherein n has a value of 3 to 10.

7. Process according to claim 6 wherein n has a value of 3 to 6.

8. Process according to claim 1 wherein n has a value of 3 to 4.

9. Process according to claim 1, wherein said polyhydroxy compound includes an amount of 2 eq.% to 60 eq.% of a difunctional hydroxy compound admixed therewith.

10. N-substituted carbamoyl lactam compound obtained by the process according to claim 1.

11. Process for preparing a nylon block copolymer which comprises polymerizing at least one lactam in the presence of a lactam polymerization catalyst and an N-substituted carbamoyl lactam compound prepared according to claim 1.

12. A process for preparing a lactam compound which consists essentially in:
mixing and adding a polyhydroxy compound having the formula:

R(OH)$_n$ wherein n has a value between 3 and 8 and R is a trivalent to octa-valent hydrocarbon residue radical of a polyhydroxy compound, said polyhydroxy compound having an equivalent weight of between 300 to 2500 with
a diisocyanate having the formula:

OCN—R'—NCO at an NCO/OH equivalents ratio >2,
wherein R' is the divalent hydrocarbon radical of a diisocyanate selected from the group consisting of 1,5-hexane diisocyanate, 1,6-hexane diisocyanate, isophorone diisocyanate, xylylene diisocyanate, 2,4- and 2,6-toluene diisocyanate, 2,2'-diphenylmethane diisocyanate, 2,4'-diphenylmethane diisocyanate, 4,4'-diphenylmethane diisocyanate, carbodiimide-modified 2,2'-diphenylmethane diisocyanate, carbodiimide-modified 2,4'-diphenylmethane diisocyanate, carbodiimide-modified 4,4'-diphenylmethane diisocyanate, hydrogenated 2,4-toluene diisocyanate, hydrogenated 2,6-toluene diisocyanate, hydrogenated xylylene diisocyanate, and hydrogenated 2,2'-, and/or 4,4'-diphenylmethane diisocyanate, and mixtures thereof; and
thereafter reacting the intermediate thus formed with at least one lactam having a 4 to 15 carbon atom ring whereby there is obtained a lactam compound having the formula:

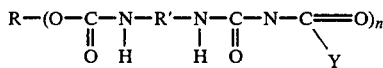

wherein R, R' and n have the same meanings as above-stated and Y is an alkylene group having 3 to 14 carbon atoms.

13. Process according to claim 12, wherein said polyhydroxy compound is selected from the class consisting of a polyether polyol, a polyester polyol, a polybutadiene polyol, a grafted polyether polyol, a polyurea dispersion in polyol, a triol or a tetra-ol of polyethylene oxide, a triol or tetra-ol of polypropylene oxide, a polyether-segment-containing polyester, a polyamine polyol having tertiary amino groups, a polylactone, a siloxane containing polyol, an ethoxylated and/or propoxylated diamine, an ethoxylated and/or propoxylated glucose, an ethoxylated and/or propoxylated fructose, an ethoxylated and/or propoxylated saccharose, an ethoxylated and/or propoxylated trimethylolpropane, and mixtures thereof.

14. Process according to claim 13 wherein said diisocyanate is 2,4- and 2,6-toluene diisocyanate.

15. Process according to claim 13 wherein said diisocyanate is 2,2'-, 2,4'- and 4,4'diphenylmethane diisocyanate.

16. Process according to claim 13 wherein said diisocyanate is isophorone diisocyanate.

17. Process according to claim 13 wherein said diisocyanate is 1,6 hexane diisocyanate.

18. Process according to claim 17 wherein said polyhydroxy compound is a polyether polyol, a polyester polyol, a polybutadiene polyol, a grafted polyether polyol, a polyurea dispersion in a polyol, a triol or a tetra-ol of polyethylene oxide, a triol or tetra-ol of polypropylene oxide, a polyether segment-containing polyester polyol, a polyamine polyol having tertiary amino groups, a polylactone polyol, a siloxane containing polyol, an ethoxylated and/or propoxylated diamine, an ethoxylated and/or propoxylated glucose, an ethoxylated and/or propoxylated fructose, an ethoxylated and/or propoxylated saccharose, an ethoxylated and/or propoxylated trimethylpropane, and mixtures thereof.

19. Process according to claim 12, wherein said polyhydroxyl compound is selected from the class consisting of polyether polyols and polyester polyols,
said polyether polyols are selected from the class consisting of ethoxylated and/or propoxylated compounds of glycerol, trimethylolpropane, pentacrythrital, alpha-methyl glucoside, sorbital, glucose, sucrose, and a diamine, and
said polyester polyols being at least trifunctional.

20. Process according to claim 1 wherein the NCO/OH ratio is about 3.